(12) United States Patent
Drela et al.

(10) Patent No.: US 8,622,334 B2
(45) Date of Patent: Jan. 7, 2014

(54) SYSTEM AND METHOD FOR REDUCING THE NOISE OF PUSHER TYPE AIRCRAFT PROPELLERS

(75) Inventors: Mark Drela, Cambridge, MA (US); John Gundlach, Fairfax, VA (US); Robert Parks, San Jose, CA (US); Adam Scott Ehrmantraut, Manassas Park, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 117 days.

(21) Appl. No.: 13/111,414

(22) Filed: May 19, 2011

(65) Prior Publication Data

US 2012/0292441 A1    Nov. 22, 2012

(51) Int. Cl.
*B64C 1/40*    (2006.01)

(52) U.S. Cl.
USPC .......................................... 244/1 N; 244/209

(58) Field of Classification Search
USPC .................. 244/1 N, 207–214, 200, 200.1
See application file for complete search history.

(56) References Cited

U.S. PATENT DOCUMENTS

| | | | | |
|---|---|---|---|---|
| 1,868,832 | A | * | 7/1932 | Henter et al. ................. 244/209 |
| 2,426,635 | A | * | 9/1947 | Mercier ....................... 244/53 R |
| 2,504,137 | A | * | 4/1950 | Lewis ............................. 244/13 |
| 3,179,354 | A | * | 4/1965 | Alvarez-Calderon ....... 244/12.4 |
| 3,831,885 | A | * | 8/1974 | Kasper ........................ 244/199.1 |
| 4,534,526 | A | | 8/1985 | Metzger |
| 4,807,831 | A | | 2/1989 | Brewer |
| 4,883,240 | A | | 11/1989 | Adamson |
| 4,917,336 | A | * | 4/1990 | Jacobs et al. .................. 244/207 |
| 4,966,338 | A | * | 10/1990 | Gordon ........................... 244/54 |
| 5,156,353 | A | * | 10/1992 | Gliebe et al. .................... 244/54 |
| 5,197,855 | A | | 3/1993 | Magliozzi |
| 5,687,934 | A | * | 11/1997 | Owens .......................... 244/208 |
| 6,896,219 | B2 | | 5/2005 | Borchers |

OTHER PUBLICATIONS

NASA SP-7037 (268), Aeronautical Engineering, A Continuing Bibliography With Indexes. Aug. 1991.
Oleson et al.'s study entitled "Small Aircraft Propeller Noise With Ducted Propeller", American Institute Aeronautics Astronautics, Inc., A98-30849 (1998).
Centrifugal & Aerodynamical Twisting Aircraft Propellers, Tip Mach Speed, Experimental Aircraft Info, Accessed Mar. 16, 2011.
Gomolzig Flugzeug—und Maschinenbau GmbH, http://www.gomolzig.de/, Mar. 16, 2011,
Mickey's RV8 Site—Aircraft Silencers and Mufflers, Fri, Jul. 14, 2006.
"Predator RQ-1 MQ-1 MQ-9 Reaper—Unmanned Aerial Vehicle (UAV)—Air Force Technology." Accessed Feb. 22, 2011.

(Continued)

*Primary Examiner* — Timothy D Collins
*Assistant Examiner* — Jamie S Stehle
(74) *Attorney, Agent, or Firm* — Katten Muchin Rosenman LLP

(57) ABSTRACT

A system and method for reducing the noise penalty of a pusher propeller, allowing an aircraft to retain its advantages for UAV configurations, while allowing acoustic performance similar to that of a tractor propeller by reducing, or eliminating, propeller noise emissions. The system and method provide an airfoil-shaped flight surface with (i) a scoop configured to route boundary layer air and associated wake from said flight surface, and (ii) a suction device configured to provide a suction pressure, wherein the scoop routes boundary layer air from the flight surface to the suction device via an opening in the flight surface.

21 Claims, 11 Drawing Sheets

(56) References Cited

OTHER PUBLICATIONS

"2.0 Propeller Noise", http://www.airboatafrika.com/wp-content/uploads/2009/03/propeller-sound.pdf.
"Swiss style muffler", available at http://www.piteraq.dk/flight/muffler.html, Mar. 16, 2011.
"The UAV—The Future of the Sky", /www.theuav.com/. Accessed Feb. 22, 2011.
NASA TP-2609, Directivity and Trends of Noise Generated by a Propeller in a Wake, P. J. W. Block and Garl L. Gentry, 1986.
NASA TP-340, Acoustic and Aerodynamic Study of a Pusher-Propeller Aircraft Model, Paul T. Soderman and W. Clifton Horne, 1990.

* cited by examiner

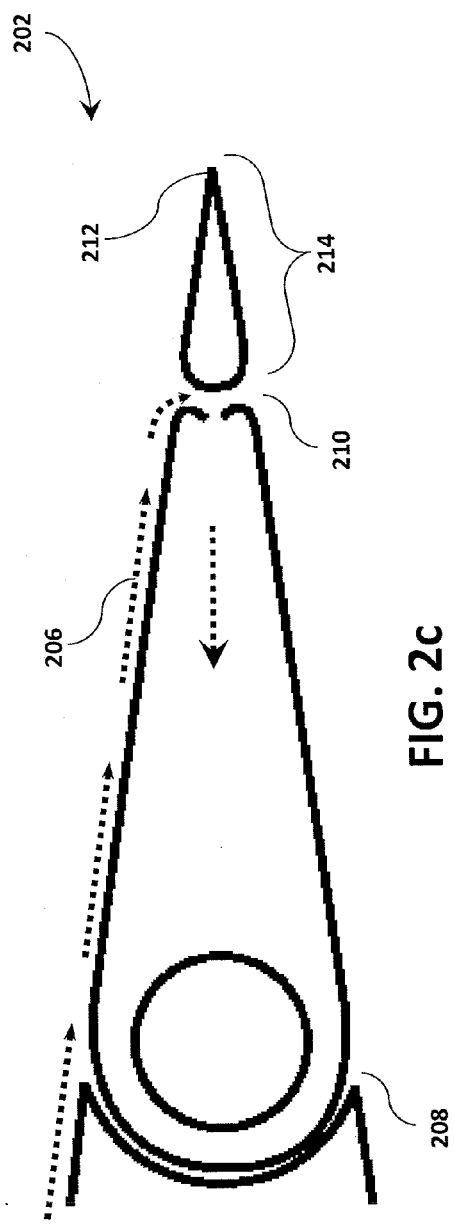
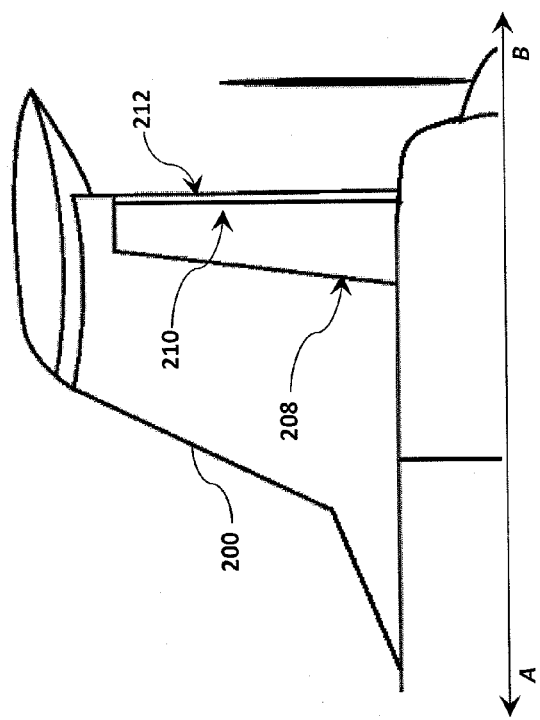
FIG. 2c
FIG. 2d

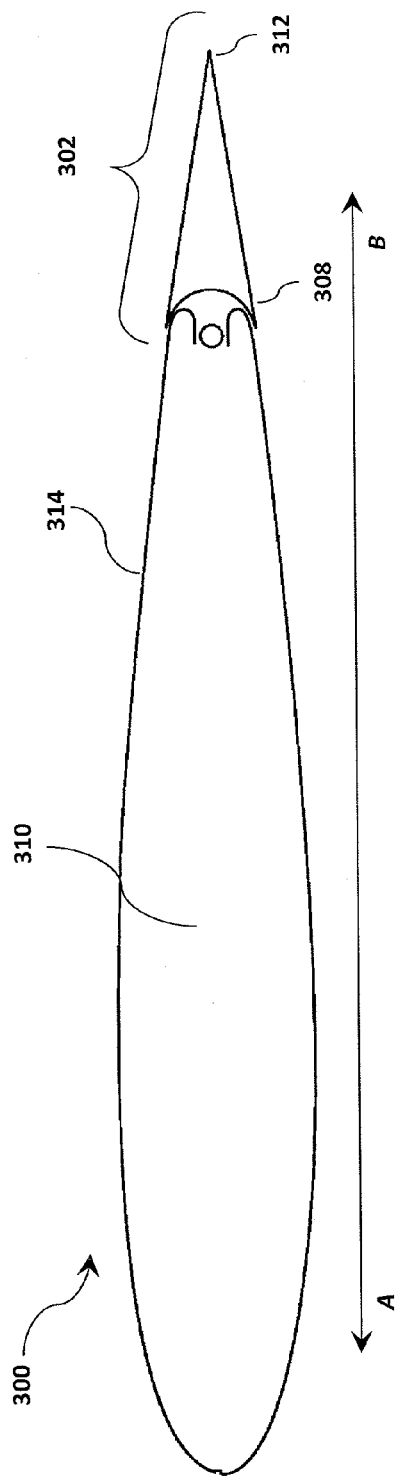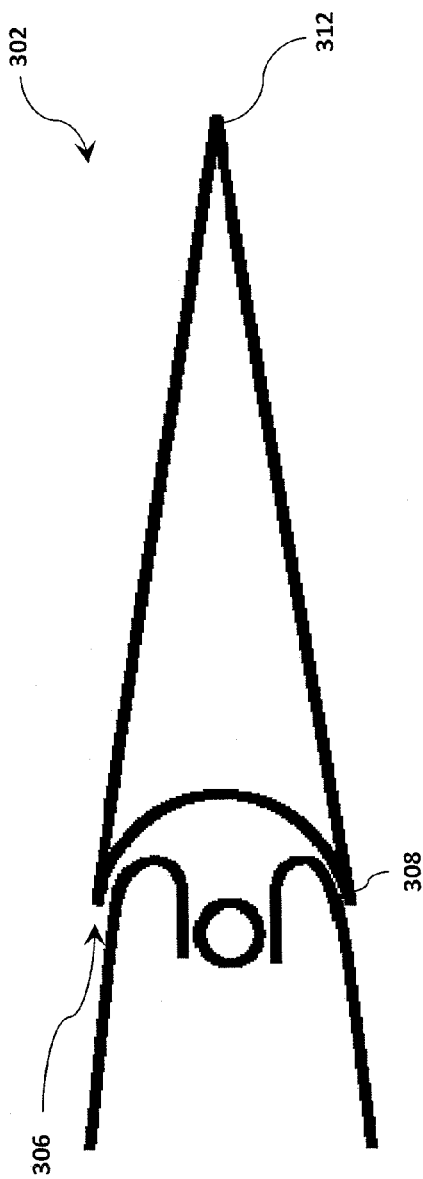
FIG. 3a
FIG. 3b

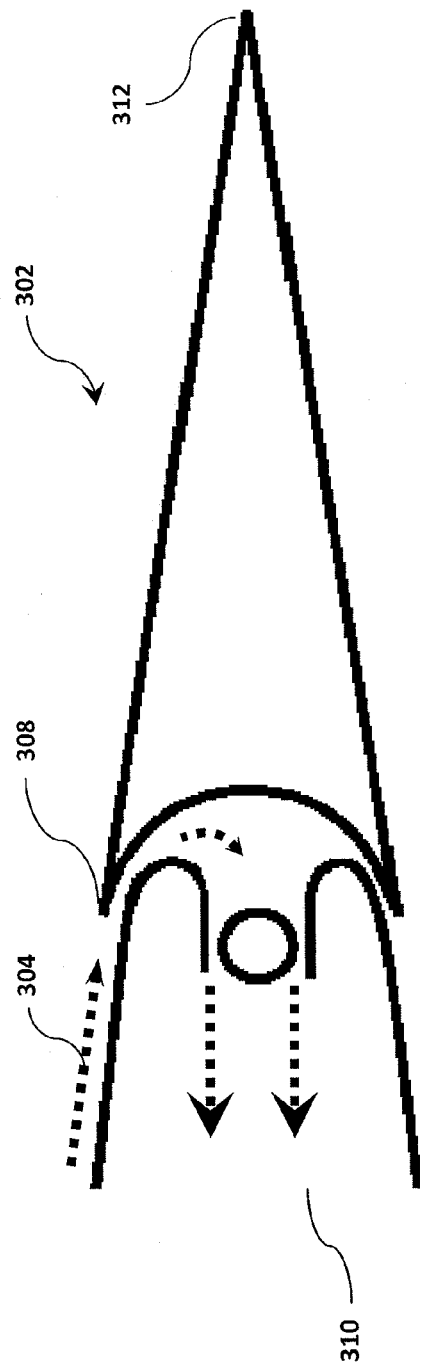
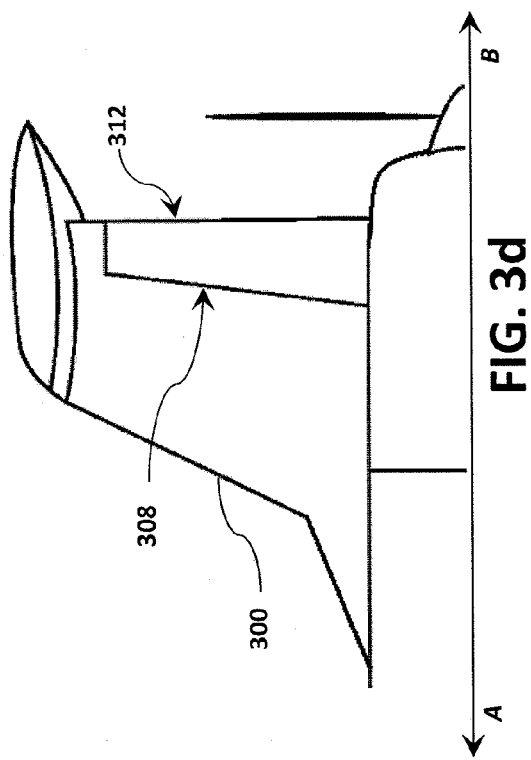
FIG. 3c
FIG. 3d

SYSTEM AND METHOD FOR REDUCING THE NOISE OF PUSHER TYPE AIRCRAFT PROPELLERS

TECHNICAL FIELD

The present invention relates to a method and apparatus for suppressing noise associated with a propeller-driven aircraft. Specifically, the present invention relates to suppression and reduction of aerodynamic noise generated when a wake encounters an aerial vehicle's pusher propeller.

BACKGROUND

An unmanned aerial vehicle (UAV) is an aircraft enabled to be flown remotely by a pilot, a navigator, or under computer control, typically without a human crew on board, and is often used for military applications. For the purposes of this application, a UAV is defined as an aircraft being capable of controlled, sustained, level flight and powered by a jet or reciprocating engine (e.g., propeller-driven). In some instances, the acronym UAV has been expanded to UAVS (Unmanned Aircraft Vehicle System), while the FAA (Federal Aviation Administration) has adopted the acronym UAS (Unmanned Aircraft System) to reflect the fact that these complex systems can include ground stations and other elements besides the actual air vehicles.

Regardless of the preferred acronym, UAV usage is growing exponentially, especially in the military, where the use and popularity of UAVs is growing at an unprecedented rate. For example, in 2005, tactical and theater-level unmanned aircraft (UA) alone had flown over 100,000 flight hours in support of Operation Enduring Freedom (OEF) and Operation Iraqi Freedom (OIF). Moreover, rapid advances in technology are enabling more functionality to be placed on smaller airframes, thus spurring a large increase in the number of Small Unmanned Aircraft Systems (SUAS) being deployed into the battlefield. However, due to the recent development and use of SUAS in combat, no formal Department of Defense reporting procedures have been established to track SUAS flight hours.

UAVs are available in an array of shapes, sizes, configurations, and characteristics; and, while historically UAVs were simple drones (remotely piloted aircraft), more recently autonomous control has been increasingly employed in modern UAVs. In fact, modern UAVs come in two basic varieties: (i) those that are controlled from a remote location; and (ii) those that fly autonomously by following preprogrammed flight plans, often using complex and dynamic automation systems.

As the capabilities grow for all types of UAVs, nations continue to subsidize their research and development, leading to further advancements enabling UAVs to perform a multitude of missions. As a result, UAVs are no longer limited to performing only intelligence, surveillance, and reconnaissance (ISR) missions, although these types of missions remain their primary use. Modern UAVs are often equipped to perform roles that include electronic attack (EA), strike missions, suppression and/or destruction of enemy air defense (SEAD/DEAD), network node or communications relay, combat search and rescue (CSAR), and various derivations of these themes. These UAVs range in cost from a few thousand to tens of millions of dollars, and the aircraft used in these systems range in size from a Micro Air Vehicle (MAV) weighing less than one pound to large aircraft weighing over 40,000 pounds.

UAV use is not limited to the armed forces; on the contrary, UAVs may be used in a growing number of civilian applications including, for example, firefighting and nonmilitary security work such as surveillance of pipelines and in disaster zones. Generally speaking, UAVs are frequently preferred for military and civilian tasks that are too dull, dirty, or dangerous for a manned aircraft. UAVs enabled to perform these tasks include, for instance, the Orion, Centaur, Skate, Excalibur, Rapid Eye, BAMS, Global Hawk, and Vulture systems—all designed by Aurora Flight Sciences Corporation, Manassas, Va., U.S.A., the assignee of the present application. For further information on the various Aurora UAV aircrafts and systems, see http://www.aurora.aero/.

When used for reconnaissance detail, a UAV can often loiter over an area for an extended period of time (e.g., a few hours) during a single mission, typically at low to medium altitudes, such as 2,000 to 3,000 ft. During these missions, major operational advantages are gained if the UAV is undetected by ground personnel. These advantages include, for example, the avoidance of an unwanted attack on the UAV, deterrence of behavioral changes of the target, and to maintain secrecy of reconnaissance UAV use.

To minimize the visual signature and prevent visual detection, UAVs may be small and/or camouflaged and, in many instances, operate in darkness. In addition, many UAVs are enabled to avoid detection by radar or infrared systems. However, despite these measures, a UAV can often be detected by its noise.

A first source of noise is the engine; however, the engine may be muffled using known technology. There are several ways to reduce the sound level from an aircraft engine. To soften engine noise, the flow of the turbulent exhaust gases can be smoothed out, or the exhaust pulsations can be modified. This may be accomplished by installing longer exhaust pipes where the last six to eight inches of the tail pipes are flattened and drilled with holes, thereby reducing sound emission. Although these tail pipe designs may help to alter the noise patterns, they are not true mufflers. A traditional aircraft muffler (e.g., those available from Gomolzig Flugzeug-und Maschinenbau GmbH, http://www.gomolzig.de/), may also be added to the exhaust system to significantly suppress or reduce engine combustion noises. In fact, a silencer, including, for example, a "Swiss-style muffler", can be built that will reduce the noise to nearly zero. In Europe, due to the economic incentives to reduce noise (e.g., lower landing fees), it is rather common to equip smaller aircraft with these mufflers. Some mufflers may be installed under the cowl, and others may be in the airstream. For further information on Swiss-style mufflers, see, for example, the article entitled "Swiss style muffler", available at http://www.piteraq.dk/flight/muffler.html. While mufflers, or silencers, are typically the preferred method, other solutions include reducing engine RPM and adding a turbocharger. Although these solutions typically result in power loss and weight increase, the net operational advantage of a quieter engine often makes the endeavor worthwhile.

Apart from engine noise, a second, and rather substantial, source of noise is created by the aircraft propellers which, unlike an engine, cannot be easily muffled. While some UAVs use jet propulsion, many UAVs are still propeller-driven and can therefore generate a significant amount of noise when a wake (typically formed by upstream flight surfaces) encounters a propeller, thereby increasing external noise levels. In fact, the noise emission of a UAV propeller (e.g., a pusher propeller) can be so strong that the propeller noise alone may be able to attract attention from ground personnel during a mission, thereby fomenting unwanted attention or a potential attack on the UAV.

Therefore, a need exists for a system and method for reducing the noise generated by a pusher propeller, enabling an aircraft to retain the advantages of its pusher propeller configuration, while yielding acoustic performance similar to that of the more traditional tractor propeller by reducing, or eliminating, wake formation and the resulting propeller-noise emissions.

SUMMARY OF THE INVENTION

The present application is directed to embodiments for reducing the noise generated by a (preferably UAV) pusher propeller, thereby enabling an aircraft to retain the advantages of its UAV configurations, while yielding acoustic performance similar to that of the more traditional tractor propeller.

In a first aspect, the present invention is directed to a system for reducing pusher propeller noise. The system comprises: an airfoil-shaped flight surface; a scoop enabled to route boundary layer air from said flight surface; a suction device enabled to provide a suction force (preferably, pressure) wherein said scoop routes boundary layer air from said flight surface to said suction device; and a slot (or other opening) in said flight surface for applying said suction force.

In a second aspect, the present invention is directed to a method for reducing pusher propeller noise. The method comprises the steps of: routing boundary layer air from an airfoil-shaped flight surface via a scoop; applying a suction force (preferably, pressure) via a slot (or other opening) in said flight surface; and providing said suction force via a suction device wherein said scoop routes boundary layer air from said flight surface to said suction device.

In a third aspect, the present invention is directed to an airfoil-shaped flight surface for reducing pusher propeller noise. The airfoil-shaped flight surface comprises: a scoop enabled to route boundary layer air; a suction device enabled to provide a suction force (preferably, pressure) wherein said scoop routes boundary layer air from said flight surface to said suction device; and a slot (or other opening) in said flight surface for applying said suction force.

In some aspects, the airfoil may be reshaped to form said scoop (wherein the scoop is integrated into the airfoil shape) and/or configured wherein airfoil pressure distribution is configured, through airfoil shape, to minimize wake development aft of the slot or other opening. The suction device may be configured to operate in multiple modes (e.g. quiet mode) and may be applied at, but not limited to: (i) a control surface hinge line; (ii) an airfoil trailing edge; or (iii) combinations thereof. Air from the boundary layer, routed through the suction means, may be used for engine cooling and other temperature management systems.

In another aspect, the suction device may be, but limited to: (i) shaft driven by the engine; (ii) driven by an electric motor; (iii) driven by a hydraulic motor; or (iv) combinations thereof. The suction device may be any structure that results in a pressure disparity between two points, thus creating a suction force/pressure. This pressure disparity may be realized without having to consume power, for example taking advantage of high and low pressure points across the aircraft.

The system and method may further comprise one or more flight control surfaces, wherein a first flight control surface may be upstream of the pusher propeller and a second flight control surface may not be upstream of the pusher propeller. In this aspect, the upstream flight control surface may be enabled to be locked in flight in a preset position to minimize the wake caused by the control surface deflection. This configuration would preferably be utilized while the aircraft operates in quiet mode.

DESCRIPTION OF THE DRAWINGS

FIG. 2b is a diagram illustrating a close-up view of the control surface of FIG. 2a;

FIG. 2c is a diagram illustrating a close-up view of the control surface of FIG. 2b showing boundary layer removal;

FIG. 2d is a diagram illustrating a top plan view of the control surface of FIGS. 2a-2c;

FIG. 3a is a diagram illustrating a cross-sectional view of a second airfoil-shaped flight surface having a control surface with a scoop toward the aft end of the airfoil-shaped flight surface;

FIG. 3b is a diagram illustrating a close-up view of the control surface of FIG. 3a;

FIG. 3c is a diagram illustrating a close-up view of the control surface of FIG. 3b showing boundary layer removal;

FIG. 3d is a diagram illustrating a top plan view of the control surface of FIGS. 3a-3c;

FIG. 4b is a diagram illustrating the pressure distributions around the airfoil-shaped flight surface of FIG. 4a.

DETAILED DESCRIPTION

Figure 1A:
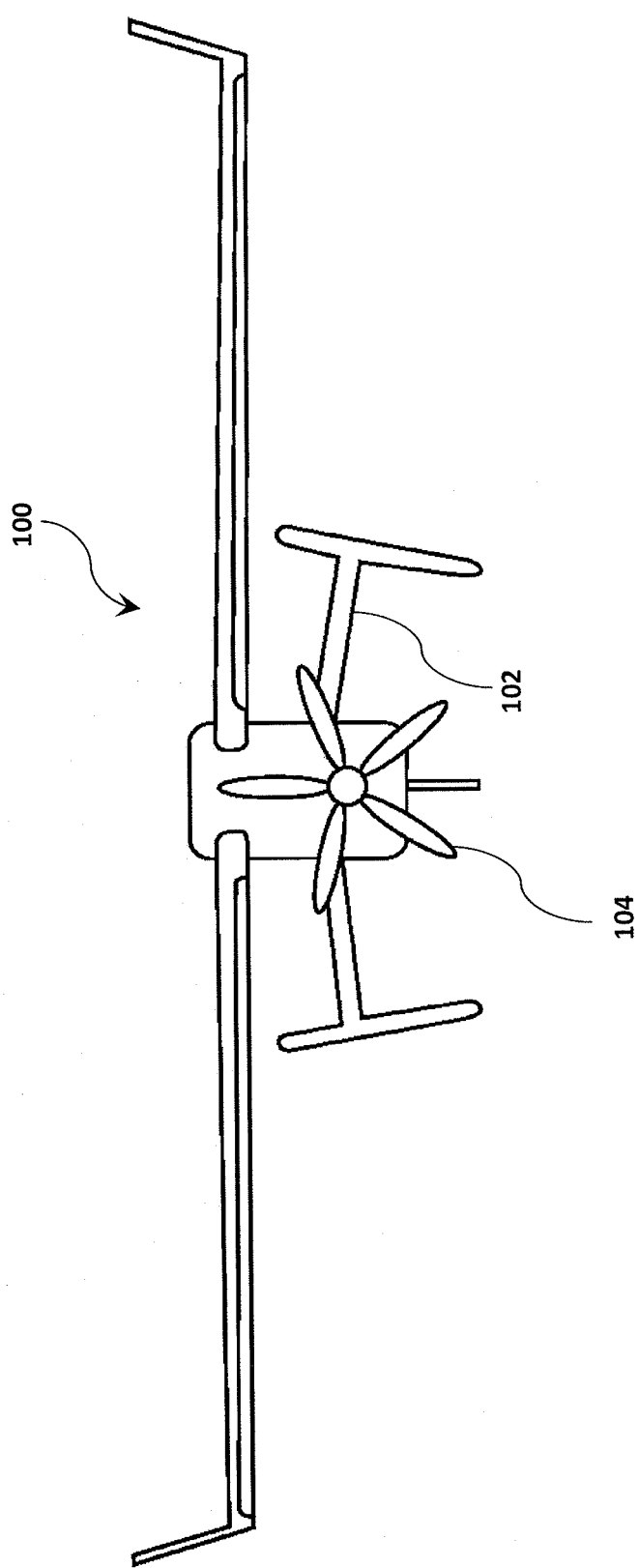
FIG. 1a is a diagram illustrating a view of the aft end of a UAV.
Figure 1B:
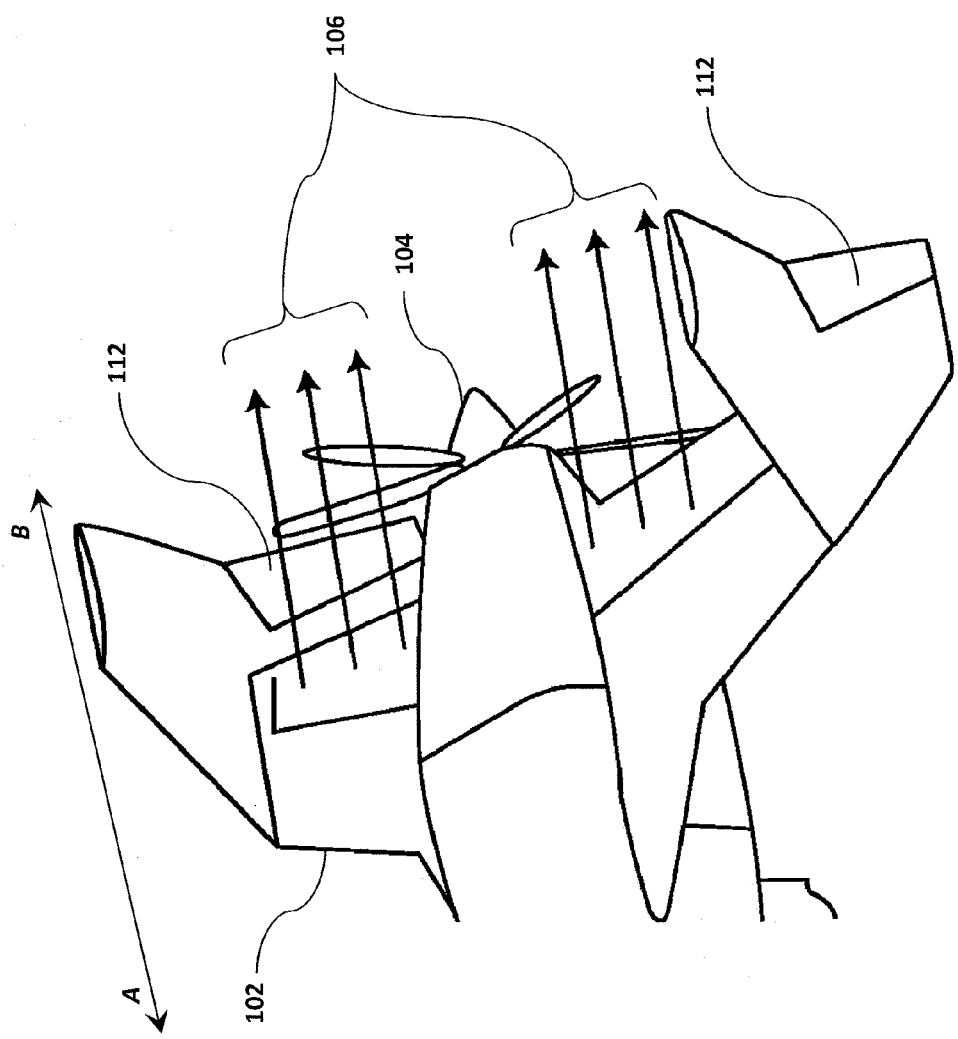
FIG. 1b is a diagram illustrating a perspective view of the aft end of a UAV.
Figure 1C:
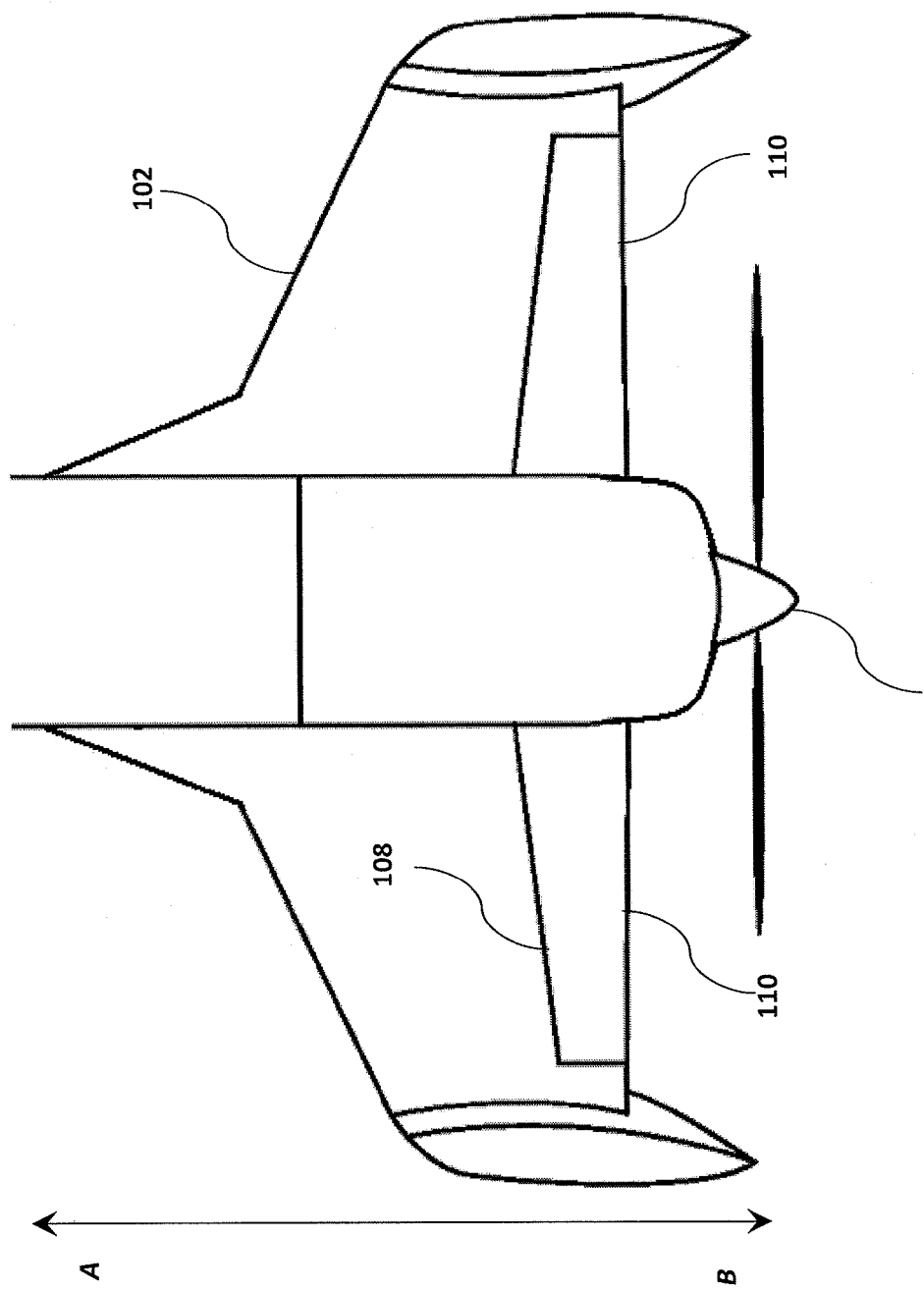
FIG. 1c is a diagram illustrating a top plan view of the aft end of a UAV.
Figure 1D:
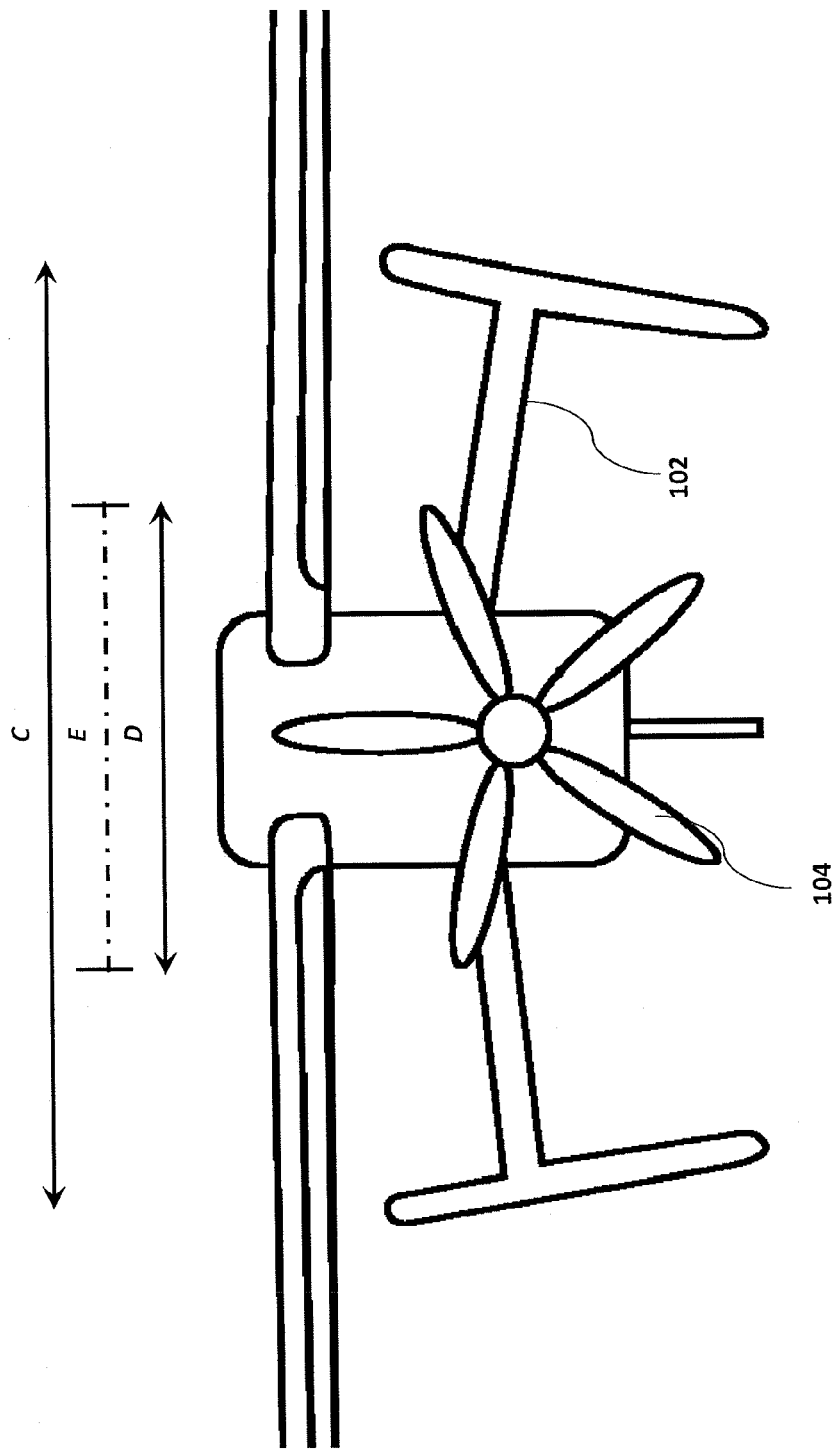
FIG. 1d is a diagram illustrating a close-up view of the aft end of a UAV.

Embodiments of the present invention will be described hereinbelow with reference to the accompanying drawings. In the following description, well-known functions or constructions may not be described in cumbersome detail because such would obscure the invention in unnecessary detail. The present invention discloses a system and method for eliminating, or greatly reducing, the wake created by flight surfaces upstream of the propeller, thereby reducing propeller noise.

A propeller blade is an airfoil and, like a wing, it will generate an aerodynamic force much the same way. It has a leading edge and a trailing edge, a camber, and a chord line. The cambered side is called the blade back and the flatter side the blade face. The angle which the chord makes to the plane of rotation is the blade angle. A propeller having one or more propeller blades is rotated by an engine to create thrust and move the aircraft forward. There are multiple methods for reducing noise attributed to an aircraft propeller. A first solution is to decrease the propeller tip speed. As the propeller rotates in a circle, increasing engine/propeller RPM will also increase the propeller tip speed. When the tips come close to, or reach, the sound barrier (Mach 1.0), the propeller typically becomes very noisy and propeller effectiveness (thrust)

reduces. Because propeller noise increases as tip speed is raised to the 6th power, even a small reduction in speed can yield a large noise reduction. Unfortunately, reducing the tip speed by reducing the RPM has one big disadvantage—propeller thrust will also reduce. A solution is to maintain a high enough RPM to generate useful thrust, but low enough to keep the propeller quiet. The maximum tip speed is often between Mach 0.88 and 0.92 where the RPM depends on the propeller diameter. Tip speed may be calculated using the formula $V_{TIP}=\pi \cdot d \cdot n$, where $\pi$ is a constant (~3.14159), d is the propeller diameter in meters, and n is angular velocity (RPM) in revolutions per minute. $V_{TIP}$ results in meters/minute.

A second solution is to install additional blades on the propeller hub to increase the frequency of the noise, thus reducing the energy in each pressure spike and thereby further reducing any unwanted noise. A downside to this approach is that additional blades can make the propeller harder to balance and maintain.

Because a significant amount of propeller noise occurs when the leading edge of the blade is perpendicular to the line of sight to the observer, a third solution is to install scimitar-shaped blades to reduce noise. A scimitar propeller is shaped like a scimitar sword, with increasing sweep along the leading edge. Typically scimitar propellers are constructed of lightweight or composite materials, but may be constructed from materials known in the art of propeller fabrication, including, for example, metal, carbon fiber, and wood. A scimitar propeller's curved propeller blade means that only a small part of the blade is perpendicular to the line of sight at any instance, thus spreading the pressure spike and reducing its amplitude to reduce noise. A fourth solution is to decrease the airspeed of the most highly loaded part of the blade by shifting propeller-loading inboard with appropriate blade shapes (e.g., scimitar).

These noise-reducing methods and concepts may be applied to nearly any propeller and are generally well-known and documented in literature. For further information on methods and concepts for reducing tractor-propeller noise, see, for example: U.S. Pat. No. 4,534,526, entitled "CABIN NOISE SUPPRESSION IN PROPELLER DRIVEN AIRCRAFT" to Metzger, et al. (the "'526 patent"); U.S. Pat. No. 4,883,240, entitled "AIRCRAFT PROPELLER NOISE REDUCTION" to Adamson, et al. (the "'240 patent"); U.S. Pat. No. 5,197,855, entitled "ENGINE EXHAUST/BLADE INTERACTION NOISE SUPPRESSION" to Magliozzi et al. (the "'855 patent"); and U.S. Pat. No. 6,896,219, entitled "PROCESS AND APPARATUS FOR NOISE REDUCTION IN MULTI-ENGINE PROPELLER-DRIVEN AIRCRAFT" to Borchers, et al. (the "'219 patent").

The '526 patent discloses the use of vibration isolators in the wing and tail surfaces of the aircraft for isolating a fuselage of a propeller-driven aircraft from vibration associated with the wake of the propeller. Although the '526 patent may decrease any noise experienced from the perspective of a passenger, the noise experienced by a person situated outside of the aircraft would not be decreased, but rather, would remain the same. Similarly, the '526 patent does not solve the issue of unwanted wake formation.

The '240 patent discloses a pair of counter-rotating aircraft propellers that produce noise in the form of a frequency-modulated carrier wave. The frequency modulation allows a designer to manipulate the energy spectrum of the noise in order to, for example, place much of the acoustic energy into inaudible frequency ranges. Although the '240 patent may decrease propeller noise, it requires the use of two propellers and does not solve the issue of unwanted wake formation.

The '855 patent discloses the reduction of aircraft engine noise for an aircraft having aft-mounted propeller blades which pass through exhaust gas streams expelled from circumferentially spaced nozzles. The '855 patent discloses nozzle rotation, or exhaust flow deflection, such that the high velocity exhaust streams expelled from the nozzles are directed away from their normal axial direction to impact the blades at the same relative angle of attack as the relative angle of attack of the low velocity ambient air stream, thereby reducing fluctuations in blade lift and associated noise. Unfortunately the '855 patent does not account for, nor reduce, the wake formed on upstream surfaces, but rather simply addresses engine exhaust.

The '219 patent discloses a process and system for noise reduction in multi-engine propeller-driven aircraft where parameters of at least two propellers are adjusted with regard to frequency, amplitude, and phase, so that the sound fields of the propellers are attenuated or completely extinguished by interference in the area of the closest aircraft fuselage. However, this process requires the use of more than one propeller and does not solve the issue of unwanted wake formation.

Therefore, with careful design and application of the foregoing systems and methods, the noise of an isolated propeller (e.g., separate from the aircraft) can be quite low. While a propeller mounted at the front of a fuselage (a/k/a "tractor propeller") can have a noise signature that is very similar to that of an isolated propeller; a pusher-propeller design, as used in a UAV, does not.

A pusher-propeller configuration refers to a propeller installed toward the aft end of the airplane—behind, for example, the wings or tails—to propel the aircraft by force applied in compression from the rear rather than in tension from the front. The pusher propeller may be situated at the rear of the fuselage or mounted near the fuselage midpoint (e.g., behind where a cockpit would typically be situated). The engine and propeller may also be mounted on the wing—in which case the propeller is typically located behind the airfoil's trailing edge rather than forward of the leading edge.

A pusher propeller provides a number of advantages to UAVs. For example, transferring obstructive propellers from the front of the plane to the rear allows for the installation of the optical payload (e.g., cameras, sensors, etc.) in the nose to yield an increased field of view. Another benefit of a pusher-propeller design is that the payload (e.g., sensors, devices, surveillance equipment, etc.) is isolated from any turbulent wake created by the propeller. Propeller wake not only promotes inaccurate payload readings, but can also degrade sensor performance and potentially harm the payload. Yet another benefit of pusher-propeller design is that it eliminates the chance of stray fluids (e.g., engine oil and coolant) from landing on the payload, thus eliminating any degrading of payload performance caused by stray fluids. Aircraft efficiency can also be gained by mounting the propeller behind the fuselage, because the propeller can re-energize boundary layer air developed on the body and reduce the form drag by keeping the flow attached. Similarly, wing efficiency can also increase, due to the absence of propeller-wash over any section of the wing. For at least the foregoing, it is irrefutable that a pusher propeller can yield a number of advantages over the more traditional tractor-propeller design, especially when applied to a UAV.

Unfortunately, despite the numerous methods used to reduce tractor-propeller noise, pusher propellers still have a dramatically higher noise signature than tractor-propeller equivalents. This is due in part to the high-speed propeller blades passing through the lower speed, and the often turbulent, aerodynamic wake caused by the various surfaces upstream of the pusher propeller (e.g., airfoils, control surfaces, and other aircraft surfaces).

According to NASA reports, a pusher propeller exhibits a noise level 20 to 30 dBs greater than the noise level of a comparable tractor propeller, putting the front and rear sector signatures at levels just a few dBs below the side-sector signature. For further information on pusher propeller noise studies, see, for example, NASA TP-2609, Directivity and Trends of Noise Generated by a Propeller in a Wake, P. J. W. Block and Garl L. Gentry, 1986; and NASA TP-340, Acoustic and Aerodynamic Study of a Pusher-Propeller Aircraft Model, Paul T. Soderman and W. Clifton Horne, 1990.

Presuming an aircraft surface and airfoil are reasonably designed and not stalled, a wake is typically created by the boundary layer air flowing over the surface of the various aircraft elements (e.g., airfoils, control surfaces, and other aircraft surfaces). The boundary layer is a region near the surface where viscous skin friction has slowed the local flow and can be relatively thick at the trailing edge of the surface, yielding a low-speed wake aft of the surface. When a propeller hits this low energy flow, pressure spikes, which are perceived as noise, are created. Because tractor-type propellers are located in front of the fuselage, they encounter minimal turbulence, thus exhibiting low noise levels when installed towards the front and side. However, pusher-type propellers endure the wake create by the aircraft, and therefore have a much higher noise level.

This concept is exemplified by pusher aircrafts such as the Piaggio Avanti. The Piaggio Avanti is a small General Aviation aircraft, approximately 11,000 lbs. gross weight, but on descent to landing, it has a much higher forward sector noise signature than a 170,000 lb. class Boeing 737. Therefore, the Avanti is audible long before it comes into visual range, even when operating at the low power levels during descent to landing, easily alerting ground personnel of its arrival. To alleviate propeller noise, a pusher propeller may be shielded and have its noise reduced by blocking the propeller's line of sight visibility using, for example, tail surfaces or a shroud ring. For further information on the effects of shrouding, see, for example, Oleson et al.'s study entitled "Small Aircraft Propeller Noise With Ducted Propeller", American Institute Aeronautics Astronautics, Inc., A98-30849 (1998). Unfortunately, it is not possible to put shielding surfaces in front or back of the propeller without sacrificing performance through added weight and drag.

In lieu of shielding, there are a number of aerodynamic solutions that may be employed to reduce wake formation and pusher propeller noise. For example, the distance from upstream surfaces to a pusher propeller may be increased, allowing any wake to diffuse into a wider band with less velocity change prior to encountering the propeller, thus reducing the noise. Unfortunately, this remedy can be very impractical and difficult to achieve in practice, because, in general, an aircraft tail should be situated as far aft as possible, while the engine and propeller cannot be too far aft without impacting, for instance, the aircraft's balance.

Another solution is to install upstream surfaces so that they and their associated wake are not aligned normally (perpendicular) with the radius of the propeller. Under this configuration, the propeller blade would not simultaneously hit the wake along its full radius, thereby reducing noise. This reduction in noise follows the same principles that allow for a reduction of noise using scimitar-shaped propellers.

Unfortunately, applying these above-mentioned noise reduction techniques may only reduce the pusher-propeller noise by about 5 to 10 dBs, leaving it at a 10 to 25 dB disadvantage compared to comparable aircraft having a tractor propeller. Therefore, the pusher-propeller airplane is still much more detectable than its tractor-propeller equivalent.

Theory and trials show that eliminating or reducing the wake may be a considerable factor in reducing propeller noise and may be accomplished using, for example, suction devices to create a boundary-layer control system for removing a boundary layer from flight surfaces. Wherein, a boundary layer is a layer of airflow most near a flight surface that is turbulent (not laminar) and has a significant velocity disparity compared to the surrounding airflow. The boundary layer, after leaving the trailing edge of the airfoil, results in creating the undesired wake. A low-pressure source of suction for a boundary-layer control system may be provided by directly connecting suction-air ducting with a reduced pressure (suction) surface on, for example, the underside of an airfoil. This is achievable because an airfoil uses low-pressure areas and high-pressure areas in order to create lift. Such low-pressure airfoil areas can sometimes be used to supply sufficient suction to strip the boundary layer off other aircraft surfaces (e.g., the upper part of an airfoil) while utilizing no additional power. When using a low-pressure area is not feasible, a suction device (e.g., suction pump or other vacuum device) may be required. In certain aircraft (e.g., higher altitude aircraft), it is likely that a suction device would be used to provide sufficient suction to strip boundary layer flows off aircraft surfaces. The suction may be applied by means of a plurality of minute holes or slots in the aircraft skin that are fluidly connected to the air-duct system. For further information on boundary-layer suction devices, see, for example, U.S. Pat. No. 4,807,831, entitled "COMBINATION BOUNDARY LAYER CONTROL SYSTEM FOR HIGH ALTITUDE AIRCRAFT" to Brewer, et al. Layer suction may further be applied through slots or holes in, for example, the wing surfaces, tail surfaces, and/or hinge lines (e.g., control surface hinge lines). There are a number of suitable power sources for a suction device, including, for example, the aircraft's engine, an electric motor, and/or a hydraulic motor. While this method can be quite effective, it can also require substantial power to operate the suction device.

A lower energy solution capable of being used alone, or in conjunction with a suction device, is to arrange aerodynamic "scoops" on the upstream surfaces (upstream from the propeller) to capture the boundary layer, and route it into the surface (e.g., inner area of the airfoil) and/or toward a suction slot, thereby greatly reducing, or even eliminating, the wake. A benefit of this system is that energy need not be exerted to strip off a bulk of the boundary layer, because the scoop directs the passing boundary layer to a desired location. One or more scoops may be located at, for example, the aft end (e.g., at or near the hinge lines), or the trailing edge of aircraft airfoils and/or surfaces. In fact, the airfoil of the wing or tail surface upstream of the propeller and aft of the suction openings may be optimized specifically to have pressure distributions that minimize the amount of wake that develops aft of the suction slots or ports.

While the scoop solution may leave a residual boundary layer created by the surface area aft of the scoop, the power required to remove the residual boundary layer is dramatically lower than using only suction devices and slots to remove the entire boundary layer. To eliminate this residual boundary layer, minute suction openings (e.g., or slots) may be installed at or near the trailing edge. In certain embodiments, the air removed from the boundary layer by suction devices may be advantageously ducted to the engine (e.g., via the inner area of the airfoil), and used to aid in the cooling of the engine or other aircraft components.

Another source of unwanted wake can stem from flight control surfaces (e.g., airfoil flaps, elevators, ailerons, rudders, etc.) on the various flight surfaces upstream of the propeller. Significant deflections on these flight control surfaces avert the wake into the propeller and produce noise when the propeller blade hits the deflected wake. Furthermore, one side of the control surface may be deflected away from the ambient flow, and this type of surface is prone to have a thick boundary layer or even separated (e.g., stalled) flow, resulting in a very large wake and resulting in high noise when in contact with the propeller.

A solution to the foregoing noise problems may be to apply the above-mentioned scoop and suction modifications to wing and/or tail airfoils and other surfaces located upstream of said propeller. In addition, to further conserve power, a suction device may be enabled to operate at the discretion of the aircraft controller (e.g., the remote pilot, operator, or computer), or a suction device may be enabled to operate only (e.g., automatically) when the aircraft is being operated in quiet mode. Quiet mode may be triggered by an aircraft controller to indicate to the various systems and subsystems that the aircraft should adjust the various settings to a preset setting to minimize detection (e.g., reduce noise, turn off lights, use downstream control surfaces, etc.).

In some embodiments, the aircraft control surfaces may even be split into sections, where one section is located upstream of the propeller, and the other section is either inline with or downstream of the pusher propeller. To operate in a quiet mode, control surfaces upstream of the pusher propeller may be locked in a position that minimizes noise by minimizing the surface boundary layer and/or wake deflection. While in this quiet mode, aircraft control may be provided by the control surfaces that are not upstream of the propeller. For example, an aircraft may be designed with an airfoil-shaped wing-set upstream of the pusher propeller and an airfoil-shaped wing-set downstream of, or inline with, the pusher propeller. Each airfoil-shaped wing-set may be equipped with flight control surfaces, and both sets of flight control surfaces may be used during normal operation (e.g., not in quiet mode); however, once quiet mode has been enabled, the upstream flight control surfaces may be adjusted to minimize wake formation, and downstream flight aircraft control surfaces may be the primary means of flight control.

FIGS. 1a-1d illustrate aft-end diagrams of an exemplary UAV 100 enabled for use with the present invention where a horizontal tail section (stabilizer) 102 is directly ahead of the propeller 104, and the tail wake 106 is ingested by the propeller 104. The tail section may include flight control surfaces such as elevators 110 and rudders 112 where the elevators 110 are attached at hinge line 108. Because the tail span C is larger than the propeller diameter D, thus only the inner part E of the tail wake 106 is ingested by the propeller 104.

Figure 2A:
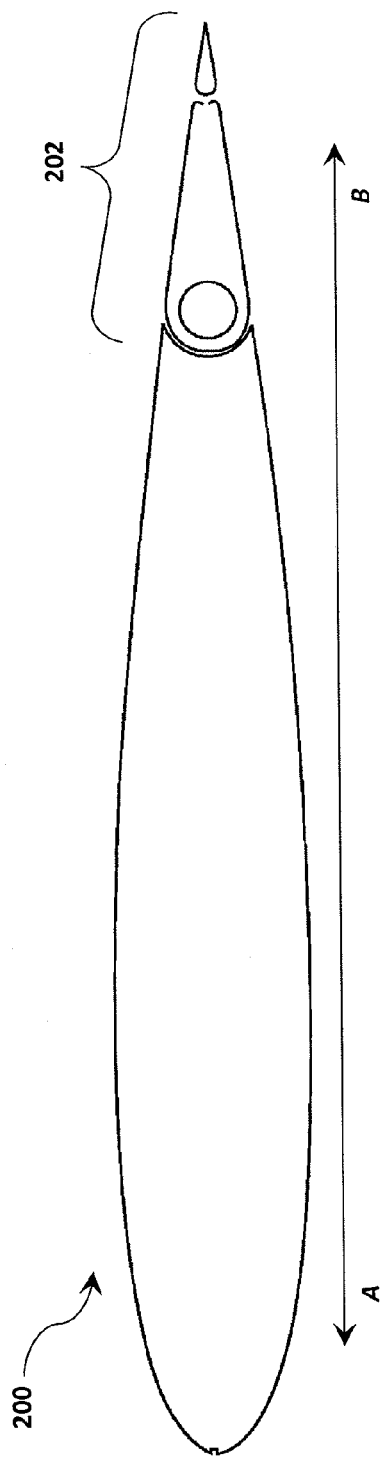
FIG. 2a is a diagram illustrating a cross-sectional view of a first airfoil-shaped flight surface having a control surface with a slot at the aft end of the airfoil-shaped flight surface.
Figure 2B:
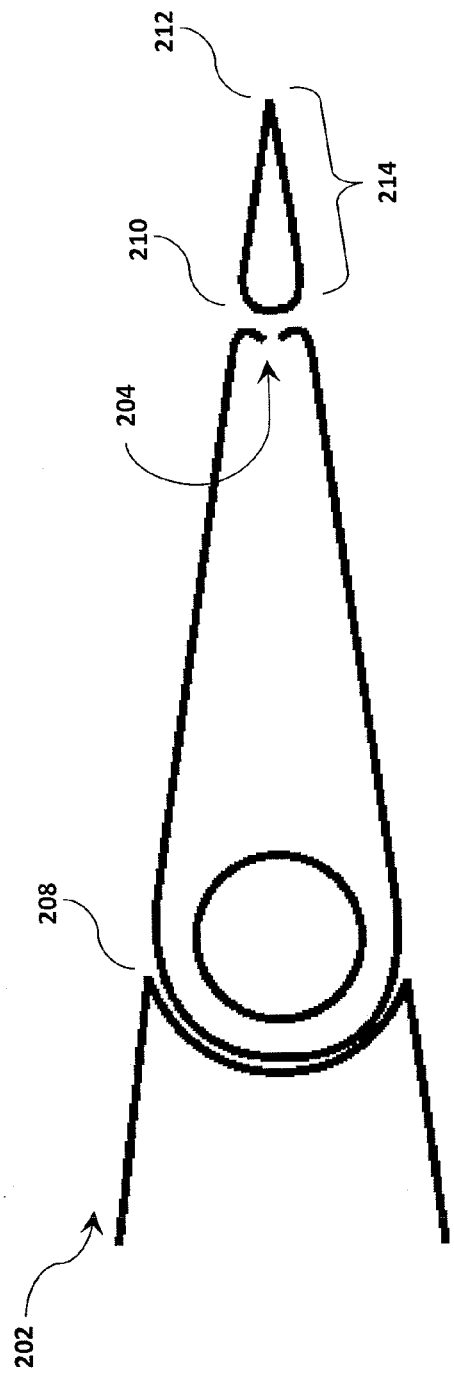

FIGS. 2a-2b illustrate cross-sectional views of a first wing airfoil 200 with a control surface 202 having a slot 204 in the aft-end B to allow a suction device (e.g., a vacuum, suction pump, etc.) to collect boundary layer 206 air from the airfoil 200 at the aft-end B, thereby greatly reducing the noise-inducing wake at propeller 104. As illustrated in FIGS. 2c and 2d, the boundary layer 206 traveling over the airfoil 200 is able to traverse the first hinge line 208; however, one or more slots 204 may be integrated with the second hinge line 210 for removing the boundary layer 206 at said second hinge line 210. Because the second hinge line 210 is located just upstream of the trailing edge 212, only a nominal amount of boundary layer air may re-form over the trailing edge section 214.

Figure 3E:
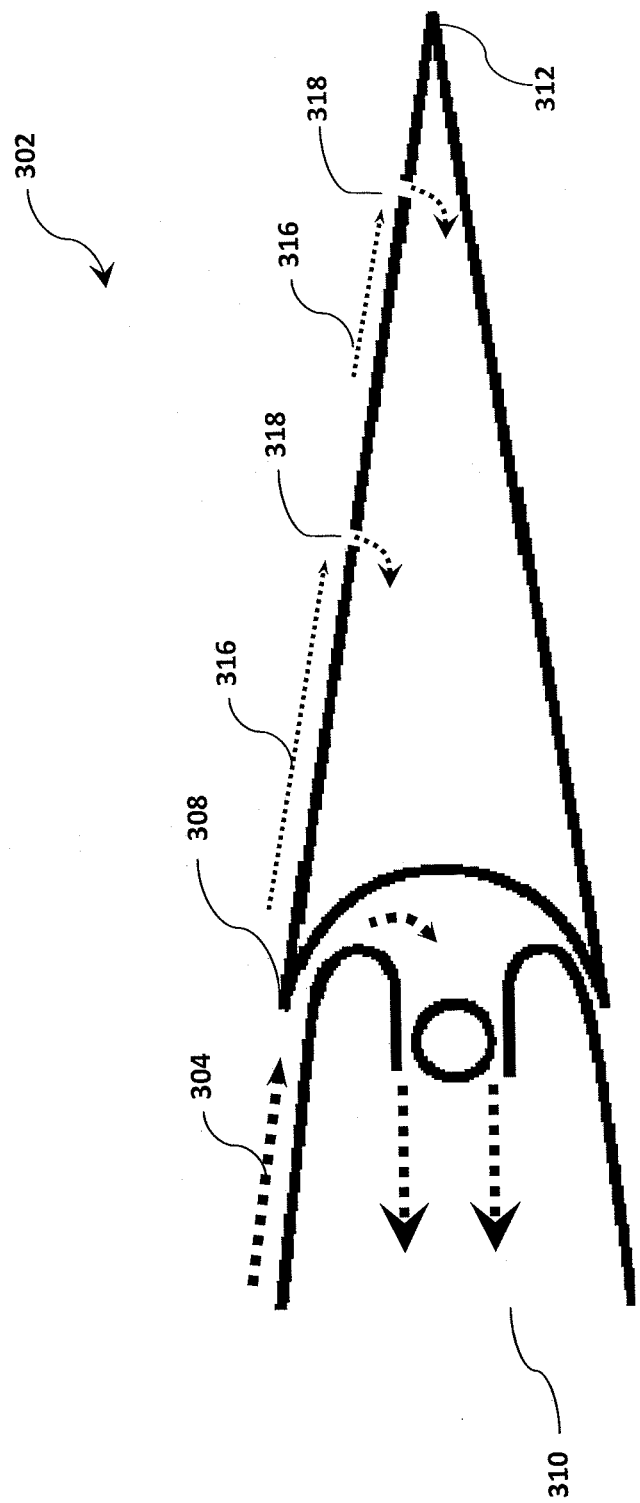
FIG. 3e is a diagram illustrating a close-up view of the control surface of FIG. 3c, wherein slots for applying suction are located in the control surface.

FIGS. 3a-3c illustrate cross-sectional views of a second wing airfoil 300. As evidenced by the figures, the control surface 302 is thicker than the main airfoil section 314 at the hinge line 308 to create a scoop 306 for collecting any boundary layer air 304 formed by the airfoil surface upstream A of the hinge line 308. The scoop 306 guides the boundary layer 304 into the interior of the airfoil 310, where it can be directed to one or more areas of the aircraft or removed by a suction device. A suction device may be used to either dispose of the air or redistribute it for use in other parts of the aircraft (e.g., for cooling). The use of the scoops 306 allows boundary layer removal while consuming much less power than the suction-only system of FIG. 2; however, as seen in FIG. 3d, there is additional surface area aft B of the scoops 306 at hinge line 308, possibly resulting in a residual boundary layer at the trailing edge 312 that may yield unwanted propeller noise. As illustrated in FIG. 3e, one or more minute suction holes or slots 318 may be used to eliminate a residual boundary layer 316 when installed at or near the trailing edge 312. There are multiple other designs for slots and scoops that can remove most, if not all, of the boundary layer, and the vehicle designer may determine the best combinations of such structure for his/her application.

While the wing airfoils shown in FIGS. 2a-2d and 3-3e are traditional National Advisory Committee for Aeronautics (NACA) airfoils, it should be realized that the removal or reduction of the boundary layer at the aft end of the airfoil allows for the development of custom airfoils to take advantage of the suction to improve performance, as well as reduces the wake formation aft of the suction point. An example of such an airfoil is shown in FIGS. 4a and 4b.

Figure 4A:
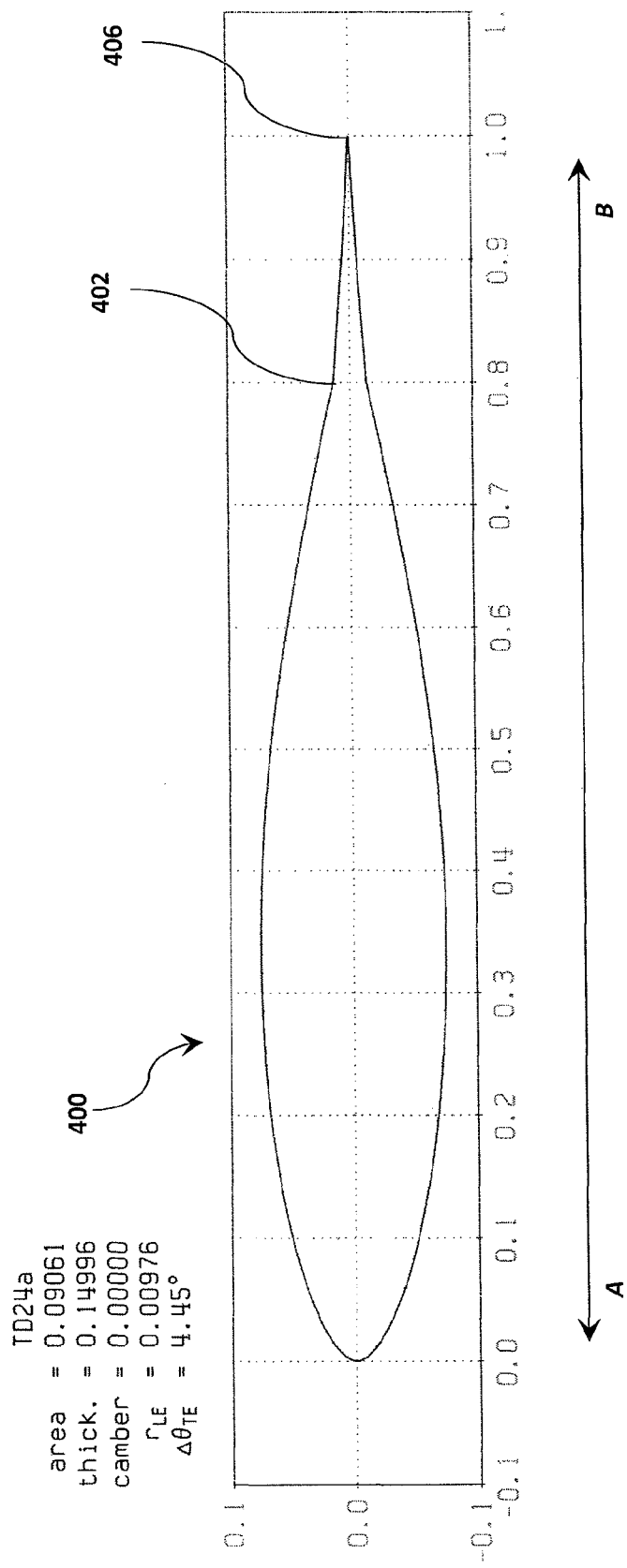
FIG. 4a is a diagram illustrating a cross-sectional view of a third airfoil-shaped flight surface having suction applied at the hinge line.
Figure 4B:
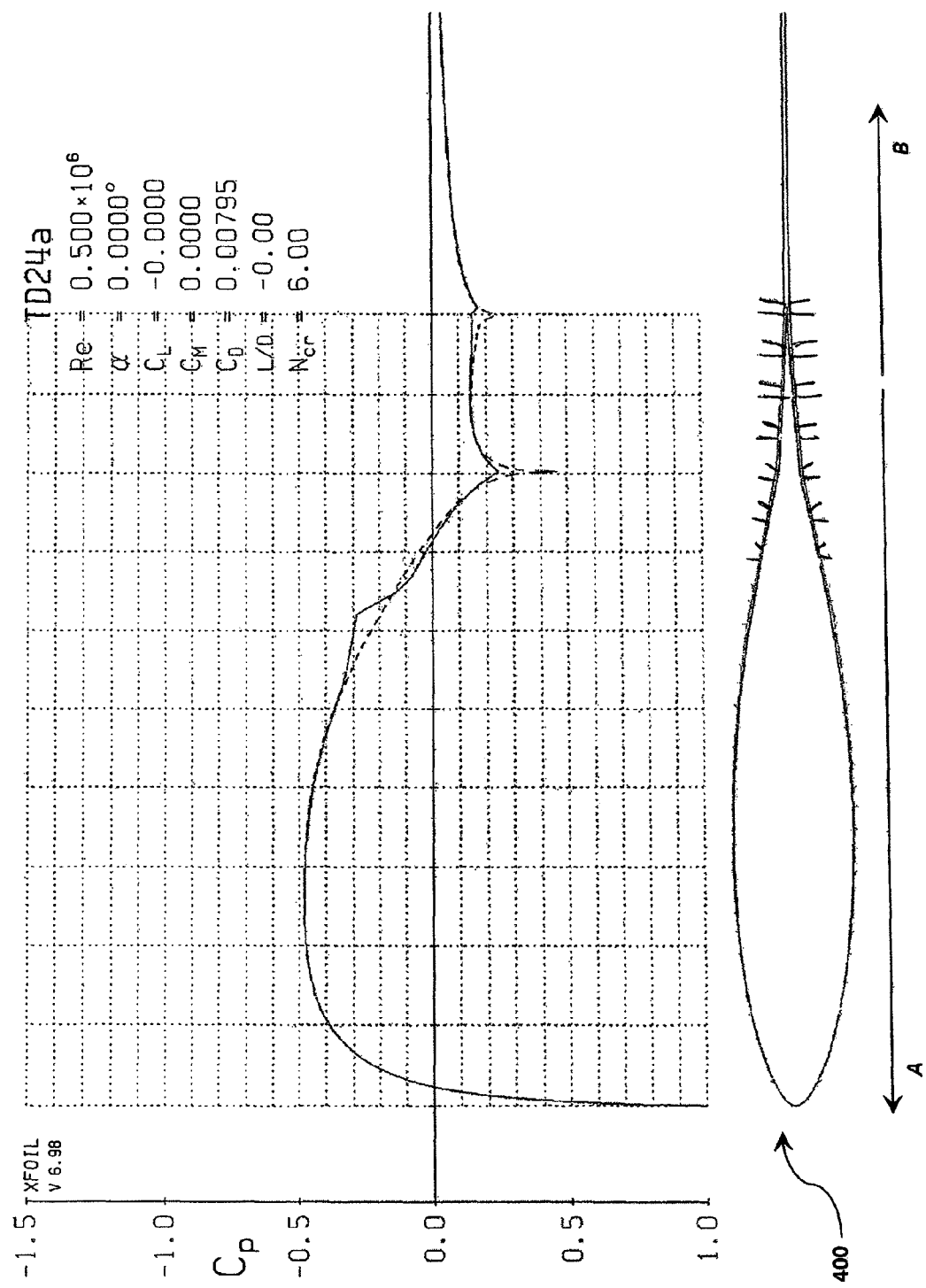

FIG. 4a illustrates a cross-sectional view of a third wing airfoil 400. FIG. 4b shows the pressure distributions around the airfoil 400 of FIG. 4a with the application of suction at 80% of the chord at the control-surface hinge line 402. The airfoil 400 is shaped so that the pressure is actually decreasing from the hinge line 402 to the trailing edge 406, which will keep the boundary-layer flow laminar (or streamlined), and thus minimize the amount of wake aft of the surface to minimize propeller noise.

Although various embodiments have been described with reference to a particular arrangement of parts, features, and the like, these are not intended to exhaust all possible arrangements or features, and indeed many other embodiments, modifications, and variations will be ascertainable to those of skill in the art. For instance, although the disclosure discusses UAV airfoils, the present disclosure and concepts should not be limited to UAV usage but may be applied to any pusher-type propeller aircraft, and be applied to, for example, primary wing airfoils, tail airfoils, and other wake-forming aircraft surfaces.

All U.S. and foreign patent documents, and all articles, brochures, and all other published documents discussed above are hereby incorporated by reference into the Detailed Description.

We claim:

1. Apparatus for reducing aircraft pusher propeller noise, comprising:
   an airfoil-shaped flight surface disposed upstream of the pusher propeller;
   a flight control surface coupled to said flight surface via a hinge;
   a scoop configured to route boundary layer air from said flight surface, the scoop being disposed at the hinge, the flight control surface being thicker than the flight surface in a direction orthogonal to a longitudinal axis of said hinge; and
   a suction device configured to provide a suction pressure, and wherein said scoop routes boundary layer air from said flight surface to said suction device.

2. The apparatus of claim 1, wherein the airfoil is shaped to form a portion of said scoop.

3. The apparatus of claim 1, wherein the airfoil-shaped flight surface and the suction device are configured to operate in different modes.

4. The apparatus of claim 1, wherein the suction device develops the suction pressure by at least one of: (i) a shaft driven by the propeller; (ii) an electric motor; (iii) an hydraulic motor; or (iv) one or more combinations thereof.

5. The apparatus of claim 1, wherein air from the boundary layer is provided for engine cooling.

6. The apparatus of claim 1, wherein the suction pressure is applied at at least one of: (i) a control surface hinge line; (ii) an airfoil trailing edge; or (iii) one or more combinations thereof.

7. The apparatus of claim 1, wherein airfoil pressure distribution is configured through airfoil shape to minimize wake development aft of said opening.

8. The apparatus of claim 1 further comprising more than one flight control surface.

9. The apparatus of claim 8, wherein said flight control surface is disposed upstream of the pusher propeller, and wherein a second flight control surface is not disposed upstream of the pusher propeller.

10. The apparatus of claim 9, wherein the flight control surface is configurable in flight to be locked or unlocked from a position to minimize wake caused by deflection of the flight control surface.

11. A method for reducing pusher propeller noise comprising the steps of:
 routing boundary layer air via a scoop from an airfoil-shaped flight surface that is upstream of the pusher propeller, the flight surface being coupled to a flight control surface via a hinge, the scoop being formed by a space between the flight surface and the flight control surface;
 applying a suction pressure via an opening in said flight surface; and
 providing said suction pressure via a suction device, wherein said scoop routes boundary layer air from said flight surface to said suction device.

12. The method of claim 11, wherein the scoop is integrated into the airfoil is shape.

13. The method of claim 11, wherein the suction device and the airfoil-shaped flight surface are configured to operate in different modes.

14. The method of claim 11, wherein the suction device develops the suction pressure by at least one of: (i) a shaft driven by the propeller; (ii) an electric motor; (iii) an hydraulic motor; or (iv) one or more combinations thereof.

15. The method of claim 11, wherein air from the boundary layer is used for engine cooling.

16. The method of claim 11, wherein suction pressure is applied at at least one of: (i) a control surface hinge line; (ii) an airfoil trailing edge; or (iii) one or more combinations thereof.

17. The method of claim 11, wherein airfoil pressure distribution is configured through airfoil shape to minimize wake development aft of said opening.

18. The apparatus of method 11 further comprising more than one flight control surface.

19. The apparatus of method 18, wherein the flight control surface is upstream of the pusher propeller, and wherein a second flight control surface is not upstream of the pusher propeller.

20. The apparatus of method 19, wherein the flight control surface is configurable in flight to be locked or unlocked from a position to minimize wake due to deflection of the flight control surface.

21. A airfoil-shaped flight surface for reducing pusher propeller noise comprising:
 a flight control surface coupled to said flight surface at a hinge;
 a scoop configured to route boundary layer air, the scoop formed by a space disposed between the flight control surface and the flight surface, the flight control surface being thicker than the flight surface in a direction orthogonal to a longitudinal axis of said hinge; and
 a suction device configured to provide a suction pressure wherein said scoop routes boundary layer air from said flight surface to said suction device.

* * * * *